United States Patent
Kanamaru (10) Patent No.: US 8,936,127 B2
(45) Date of Patent: Jan. 20, 2015

(54) CONSTRUCTION MACHINE WITH AIR SUCTION STRUCTURE

(71) Applicant: Kobelco Construction Machinery, Co., Ltd., Hiroshima (JP)

(72) Inventor: Hiroshi Kanamaru, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 14/164,972

(22) Filed: Jan. 27, 2014

(65) Prior Publication Data

US 2014/0238759 A1    Aug. 28, 2014

(30) Foreign Application Priority Data

Feb. 22, 2013    (JP) ................................. 2013-033282

(51) Int. Cl.
*B62D 25/10*    (2006.01)
*B60K 11/06*    (2006.01)

(52) U.S. Cl.
CPC ....................................... *B60K 11/06* (2013.01)
USPC ..................................... 180/69.24; 180/69.21

(58) Field of Classification Search
CPC .......... E02F 9/08; E02F 9/0891; B60K 11/04; B60K 13/02; B62D 25/10; F02M 35/161
USPC ......... 180/68.1, 68.3, 68.4, 68.6, 69.2, 69.21, 180/69.23, 69.24, 69.25, 289; 454/107, 454/109, 146; 296/193.11, 193.09, 203.01, 296/203.02, 208; 277/606
See application file for complete search history.

(56) References Cited

U.S. PATENT DOCUMENTS

| | | | |
|---|---|---|---|
| 3,987,766 A | | 10/1976 | Welck |
| 4,133,547 A | * | 1/1979 | Fox ............................... 180/68.3 |
| 4,787,668 A | * | 11/1988 | Kawase et al. .................. 296/93 |
| 6,032,620 A | * | 3/2000 | Tsukiana et al. ........... 123/41.48 |

(Continued)

FOREIGN PATENT DOCUMENTS

| | | |
|---|---|---|
| EP | 0 468 322 A1 | 1/1992 |
| JP | 2007-39936 | 2/2007 |

(Continued)

OTHER PUBLICATIONS

European Search Report dated Aug. 11, 2014, in European Application No. 14153596.3.

*Primary Examiner* — Brodie Follman
(74) *Attorney, Agent, or Firm* — Oblon, Spivak, McClelland, Maier & Neustadt, L.L.P.

(57) ABSTRACT

Provided is a construction machine including a guard panel with an air suction port and capable of ensuring a required intake opening area with suppressed disadvantages of the air suction port. The construction machine includes an engine, a cooling fan, and a heat exchanger which are accommodated in a device accommodation space in an upper slewing body, and a guard panel covering the device accommodation space. The guard panel includes a first panel with an opening edge defining an opening and a second panel that opens and closes the opening and has a peripheral portion to be supported by the opening edge with the opening closed. Respective parts of the peripheral portion and the opening edge are shifted from each other in an inward-outward direction to form an air suction port bringing the device accommodation space into communication with outside, between the second panel and the first panel.

5 Claims, 6 Drawing Sheets

(56) References Cited

U.S. PATENT DOCUMENTS

| | | | |
|---|---|---|---|
| 6,135,223 A * | 10/2000 | Miyachi et al. | 180/69.21 |
| 6,615,942 B2 * | 9/2003 | Shinohara et al. | 180/69.21 |
| 6,626,256 B2 * | 9/2003 | Dennison et al. | 180/69.24 |
| 6,634,449 B2 * | 10/2003 | Randolph | 180/69.24 |
| 7,134,519 B2 * | 11/2006 | Imashige | 180/69.24 |
| 7,401,672 B2 * | 7/2008 | Kurtz et al. | 180/68.4 |
| 7,416,219 B2 * | 8/2008 | Sato et al. | 280/830 |
| 7,717,204 B2 * | 5/2010 | Kondou et al. | 180/68.1 |
| 8,100,209 B2 * | 1/2012 | Goldsberry | 180/68.1 |
| 8,118,352 B2 * | 2/2012 | Rocheblave et al. | 296/193.11 |
| 8,365,855 B2 * | 2/2013 | Mamada et al. | 180/68.1 |
| 8,550,198 B2 * | 10/2013 | Isaka et al. | 180/68.1 |
| 8,550,534 B2 * | 10/2013 | Tsukamoto et al. | 296/146.1 |
| 8,646,556 B2 * | 2/2014 | Shimada et al. | 180/69.2 |
| 8,657,048 B2 * | 2/2014 | Uetake | 180/68.1 |
| 2004/0035551 A1 * | 2/2004 | Tamura et al. | 165/41 |
| 2008/0000704 A1 * | 1/2008 | Yonezawa et al. | 180/69.24 |
| 2008/0191500 A1 * | 8/2008 | Kondou et al. | 293/117 |
| 2009/0242296 A1 * | 10/2009 | Goldsberry | 180/68.3 |
| 2010/0219008 A1 * | 9/2010 | Isaka et al. | 180/68.1 |
| 2010/0236855 A1 * | 9/2010 | Matsushita et al. | 180/69.2 |
| 2010/0301638 A1 * | 12/2010 | Hinshaw et al. | 296/208 |
| 2011/0214931 A1 * | 9/2011 | Nakashima | 180/68.1 |
| 2012/0298434 A1 * | 11/2012 | Khouw et al. | 180/68.3 |
| 2013/0068177 A1 * | 3/2013 | Yotsuzuka | 123/41.58 |
| 2013/0074410 A1 * | 3/2013 | Berkeland | 49/142 |
| 2013/0216344 A1 * | 8/2013 | Uetake | 414/687 |

FOREIGN PATENT DOCUMENTS

| | | |
|---|---|---|
| JP | 2010-30472 | 2/2010 |
| JP | 2012-102500 A | 5/2012 |

* cited by examiner

CONSTRUCTION MACHINE WITH AIR SUCTION STRUCTURE

BACKGROUND OF THE INVENTION

1. Technical Field

The present invention relates to a construction machine including a heat exchanger and an air suction structure for introducing outside cooling air and guiding the air to the heat exchanger.

2. Description of the Background Art

The background art of the present invention will be described taking an excavator shown in FIG. 4 to FIG. 6 as an example.

Figure 4:
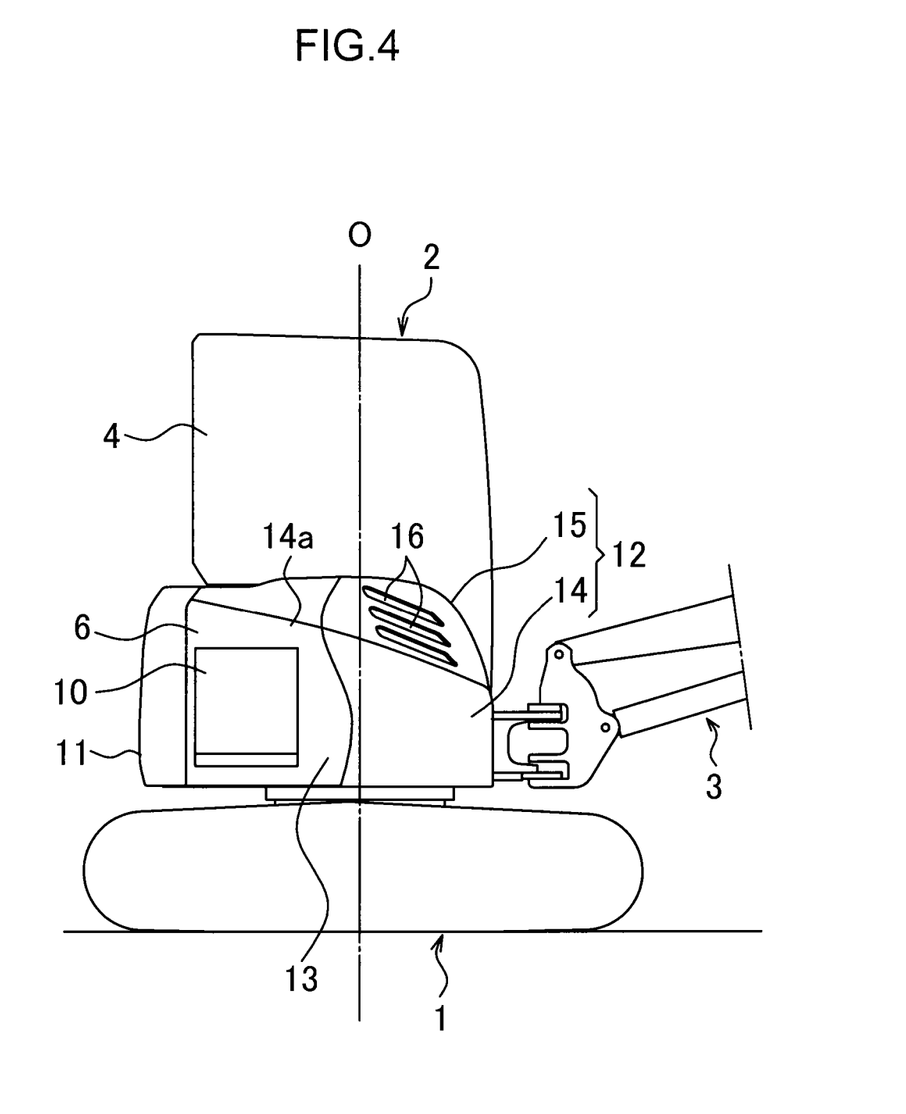
FIG. 4 is a right side view of a partly cutaway conventional excavator.
Figure 5:
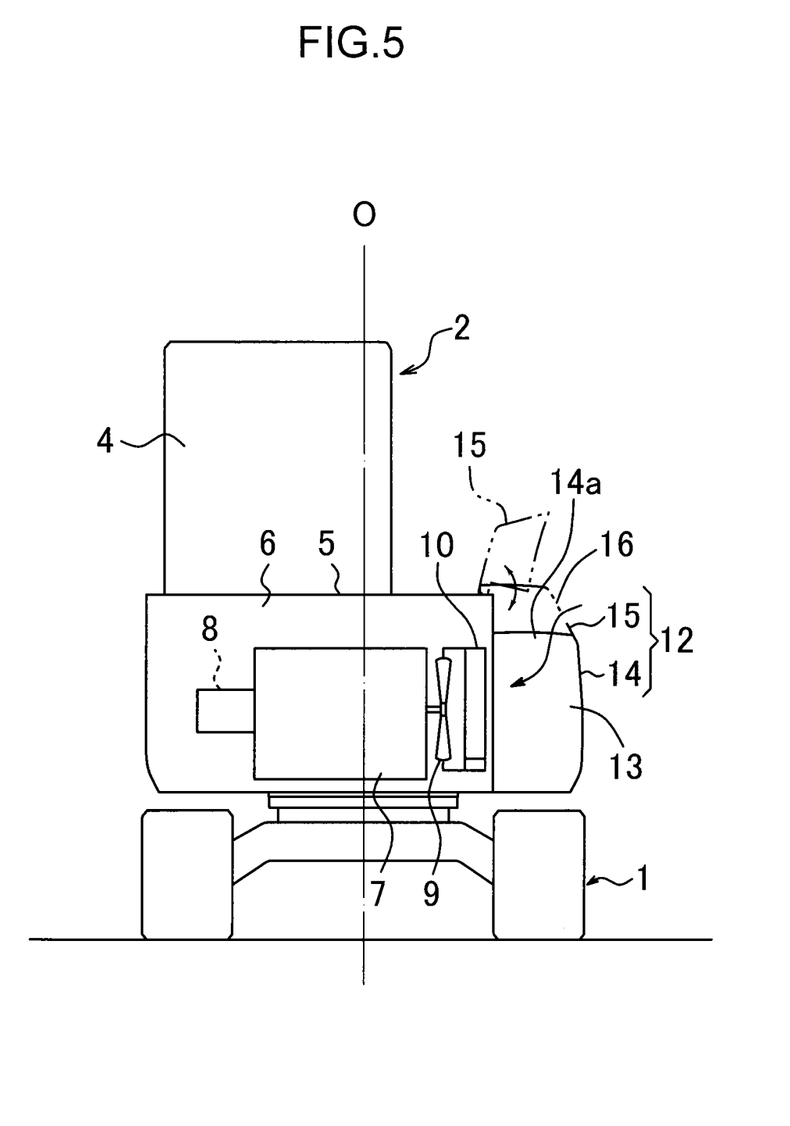
FIG. 5 is a rear view of the excavator shown in FIG. 4.

The excavator includes a crawler-type lower travelling body 1, an upper slewing body 2 mounted on the lower travelling body 1 so as to be able to slew around an axis O perpendicular to the ground, and a front attachment 3 for an excavation operation attached to a front portion of the upper slewing body 2; the lower travelling body 1, the upper slewing body 2, and the front attachment 3 are shown in FIG. 4 and FIG. 5. In the specification, "front-back" and "lateral" mean directions as viewed from inside a cabin 4 installed in the upper slewing body 2.

Figure 6:
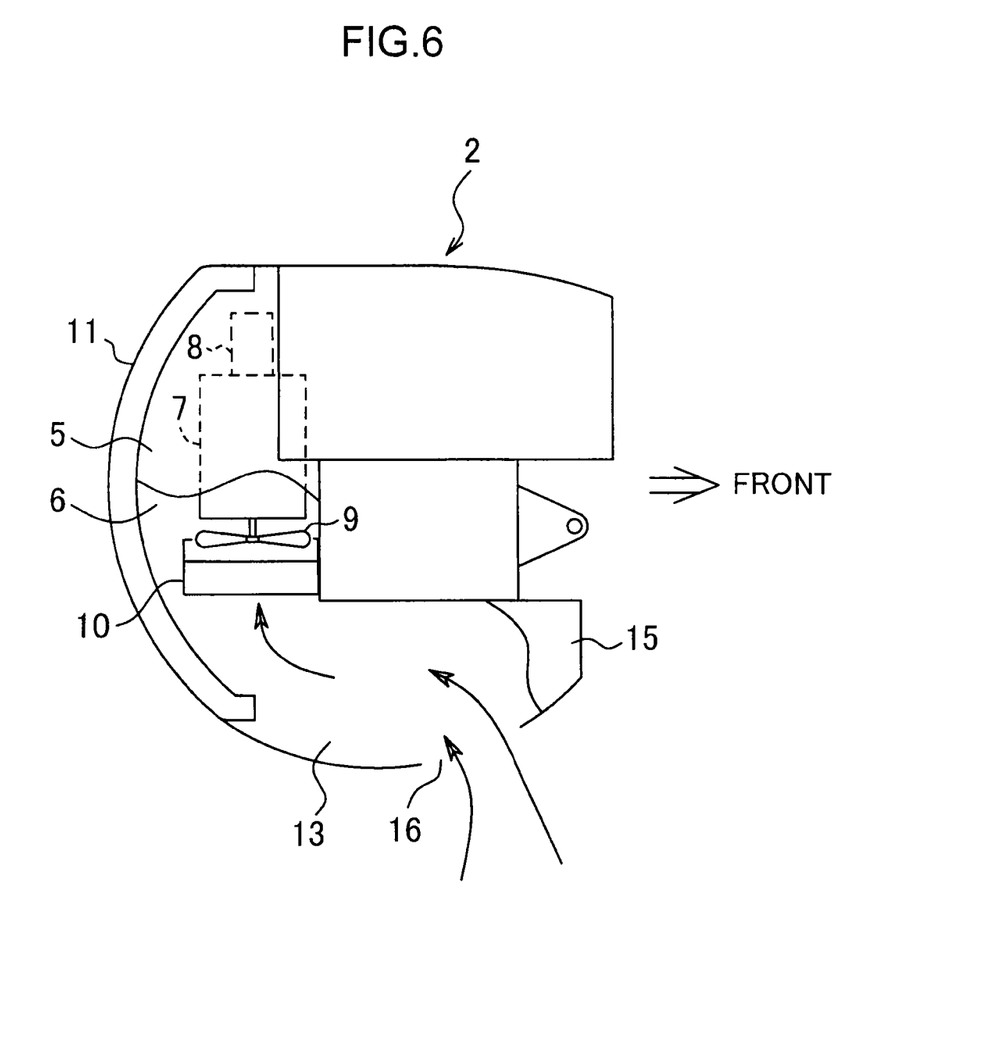
FIG. 6 is a plan view of the excavator shown in FIG. 4.

The excavator further includes a rear guard panel 5 that covers an engine room 6 positioned in a rear portion of the upper slewing body 2, a counterweight 11, and a side guard panel 12, as also shown in FIG. 6.

The engine room 6 forms a first device accommodation space that accommodates devices. The devices include an engine 7, a hydraulic pump 8, a cooling fan 9 and a heat exchanger 10, which are laterally juxtaposed so as to locate the heat exchanger 10 at the right end of the lateral arrangement. The heat exchanger 10 includes a radiator and an oil cooler. The cooling fan 9 rotates to introduce outside cooling air and blow the air through the heat exchanger 10. The rear guard panel 5 has a non-graphically-shown top panel that is openable and closable, for example, like a hood for maintenance of the engine 7 or the like. The counterweight 11 is installed in an area behind the engine room 6, that is, at a rear end of the upper slewing body 2.

The side guard panel 12 covers a device room 13 positioned on a right side of the upper slewing body 2 (opposite to the cabin 4). The device room 13 forms a second device accommodation space that accommodates devices, extending in a front-back direction to communicate with the engine room 6 at a rear portion of the device room 13. The devices accommodated in the device room 13 include tanks, valves, and a battery.

The side guard panel 12 has a first panel 14 and a second panel 15. The first panel 14 is an immobile, fixed panel and has an opening 14a for maintenance located at an upper end of the first panel 14 and shown in FIG. 4 and FIG. 5. The second panel 15 is connected to the first panel 14, similarly to the top panel of the rear guard panel 5, so as to open and close the opening 14a like a hood. Specifically, the second panel 15 has a left peripheral portion, that is, a cabin 4-side peripheral portion, which is connected to an opening edge of the first panel 14 through a hinge. The second panel 15 pivots around the hinge to open and close the opening 14a.

The second panel 15 is attached with a seal member (not shown in the drawings), for example, a weather strip, in a peripheral portion of the second panel 15. The peripheral portion of the second panel 15 can be supported by the opening edge of the first panel 14 in a state where the second panel 15 is closed, and, upon this, the seal member makes close contact with the opening edge.

This type of excavator preferably has an air suction structure for feeding outside cooling air toward the heat exchanger 10. As such an air suction structure, a commonly known is one disclosed in Japanese Patent Publication Laid-open Nos. 2010-30472 and 2007-39936, that is, a structure having a guard panel that covers a device accommodation space (in the excavator described above, the engine room 6 or the device room 13), the guard panel including a plurality of openings, namely, air suction ports. By way of example, FIG. 4 to FIG. 6 show air suction ports 16 formed in a front right side surface portion of the second panel 15 constituting the side guard panel 12. Each of the air suction ports 16 is shaped like a slot that is elongate in the front-back direction. Moreover, there can be a case of providing an air suction port also in the first panel 14 or the rear guard panel 5.

Furthermore, in recent years, the required amount of introduced outside air has tended to increase in conjunction with larger power facilities resulting from emission control and the like, which involves a requirement of the sum of the areas of air suction ports, that is, in the total opening area, specifically, a requirement of an increase in the number and size of air suction ports. However, such an increase in the number and size of air suction ports may degrade the appearance of the excavator or accelerate external leakage of noise such as engine sound and infiltration of rainwater. Moreover, a decrease in the effective area of the guard panel may make application of design decals and a caution label be difficult. As means for waterproof measures against an increase in the number of the air suction ports, there can be application of a louver to the air suction ports or improvement of a process of making electric components waterproof; however, these measures involve a significant increase in costs.

SUMMARY OF THE INVENTION

An object of the present invention is to provide a construction machine including a guard panel with an air suction port, the construction machine being capable of having required intake opening area with suppressed disadvantages of the air suction port. A construction machine provided by the present invention includes: a lower travelling body; an upper slewing body mounted on the lower travelling body so as to be able to slew and having a device accommodation space; devices accommodated in the device accommodation space, the device including an engine, a cooling fan and a heat exchanger, the cooling fan adapted to rotate to introduce outside cooling air into the device accommodation space and blow the air through the heat exchanger; a guard panel to cover the device accommodation space, the guard panel including a first panel with an opening edge defining an opening for maintenance and a second panel provided pivotably so as to open and close the opening and having a peripheral portion adapted to be supported by the opening edge of the first panel in a state where the second panel closes the opening; and a seal member attached to the peripheral portion of the second panel to make close contact with the opening edge of the first panel in a state where the second panel closes the opening. A part of the peripheral portion of the second panel and a corresponding part of the opening edge of the first panel are shifted from each other in an inward-outward direction of the first and second panels to thereby form an air suction port, which brings the device accommodation space into communication with an outside thereof, between the second panel and the first panel.

DESCRIPTION OF THE PREFERRED EMBODIMENTS

An embodiment of the present invention will be described with reference to FIG. 1 to FIG. 3. In the embodiment, there is an excavator, to which the present invention is applied. The excavator according to the embodiment is the same as the excavator shown in FIG. 4 to FIG. 6 in the following aspects (A) to (C). Hence, the following explanation is made referring the above Description of the Background Art and the description of FIG. 4 to FIG. 6 for arrangements related to the same aspects, for example, some facilities and devices such as a lower travelling body and a front attachment, and omitting detailed description of the arrangements.

(A) The excavator according to the embodiment includes a crawler-type lower travelling body, an upper slewing body 2 mounted on the lower travelling body so as to be able to slew around an axis O perpendicular to the ground, and a front attachment for an excavation. The front attachment is attached to a front portion of the upper slewing body 2.

Figure 1:
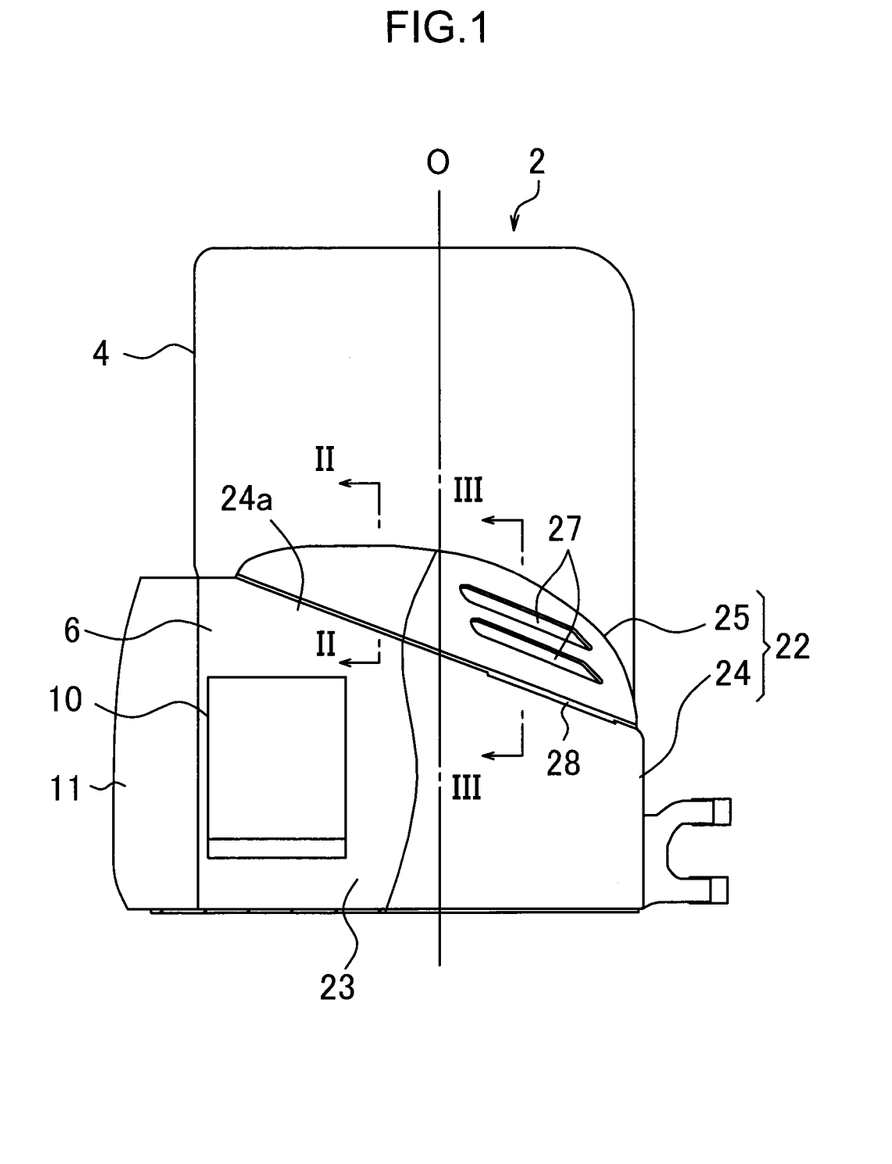
FIG. 1 is a right side view of an upper slewing body of a construction machine according to an embodiment of the present invention, the upper slewing body having an air suction structure.
Figure 2:
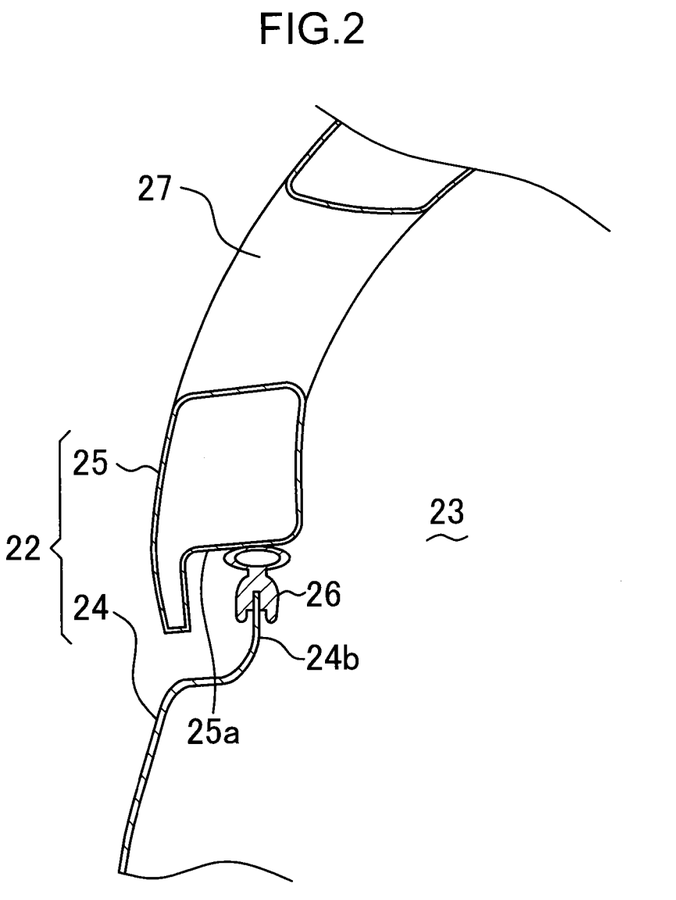
FIG. 2 is an enlarged cross-sectional view taken along line II-II in FIG. 1.

(B) The upper slewing body 2 is provided with a rear guard panel in a rear portion thereof and the rear guard cover covers an engine room 6 shown in FIG. 1, which is a first device accommodation space. The engine room 6 accommodates devices. The devices include an engine, a hydraulic pump, a cooling fan, and a heat exchanger 10, which are laterally juxtaposed so as to locate the heat exchanger 10 at the right end of the lateral arrangement. The heat exchanger 10 includes a radiator and an oil cooler. The cooling fan is adapted to rotate to introduce outside cooling air and blow the air through the heat exchanger 10.

(C) A cabin 4 is installed in a left area of the upper slewing body 2, and a counterweight 11 is installed at a rear end of the upper slewing body 2, that is, in an area behind the engine room 6.

The excavator according to the embodiment includes a side guard panel 22 instead of the side guard panel 12 shown in FIG. 4 and other figures. The side guard panel 22 covers a second device accommodation space, namely, a device room 23. The device room 23 is provided in a right area of the upper slewing body 2, that is, an area opposite to the cabin 4, and extends in a front-back direction to communicate with the engine room 6 at a rear portion of the device room 23. The device room 23 accommodates devices including tanks, valves, and a battery.

The side guard panel 22 has a first panel 24 and a second panel 25. The first panel 24 is an immobile, fixed panel and has an upper end formed with an opening 24a for maintenance as shown in FIG. 1. The second panel 25 is connected to the first panel 24 so as to open and close the opening 24a like a hood. Specifically, the second panel 25 has a proximal peripheral portion that is a left peripheral portion, i.e., the cabin 4-side peripheral portion. The proximal peripheral portion is connected to an opening edge of the first panel 24 through a hinge not shown in the drawings. The second panel 25 pivots around the hinge to open and close the opening 24a.

The first panel 24 has an opening edge 24b that is a peripheral portion surrounding the opening 24a. The opening edge 24b is attached with a seal member 26 as shown in FIG. 2, for example, a weather strip. The opening edge 24b supports a peripheral portion of the second panel 25 at a lower side thereof in a state where the second panel 25 is closed. In this state, the seal member 26 makes close contact with a lower surface 25a of the peripheral portion.

The second panel 25 is formed with a plurality of air suction holes 27. The air suction holes 27 are vertically juxtaposed in a front right side surface of the second panel 25, each of them having a shape like a slot elongate in the front-back direction.

Moreover, the excavator is characterized in that the first panel 24 and the second panel 25 form an air suction port 28 other than the air suction holes 27 in respective portions where the first panel 24 and the second panel 25 are opposed to each other. The air suction port 28 according to the embodiment is formed between an opening edge in a right side portion of the first panel 24 and a right peripheral portion (lower end portion) of the second panel 25. Specifically, the opening edge 24b on the right side of the first panel 24 is formed with a recess portion 24c so as to locate a front-back directional part of the opening edge 24b, i.e., a front portion (in FIG. 1, a right portion) of the opening edge 24b in the embodiment, at an inwardly retracted position relative to the other portions as shown in FIG. 3. The recess portion 24c shifts the opening edge 24b of the first panel 24 and the peripheral portion of the second panel 25 from each other in an inward-outward direction, thereby forming an up-down directional gap c1 and an inward-outward directional gap c2 between the opening edge 24b of the first panel 24 and the peripheral portion of the second panel 25. These gaps c1 and c2 constitute the air suction port 28.

Figure 3:
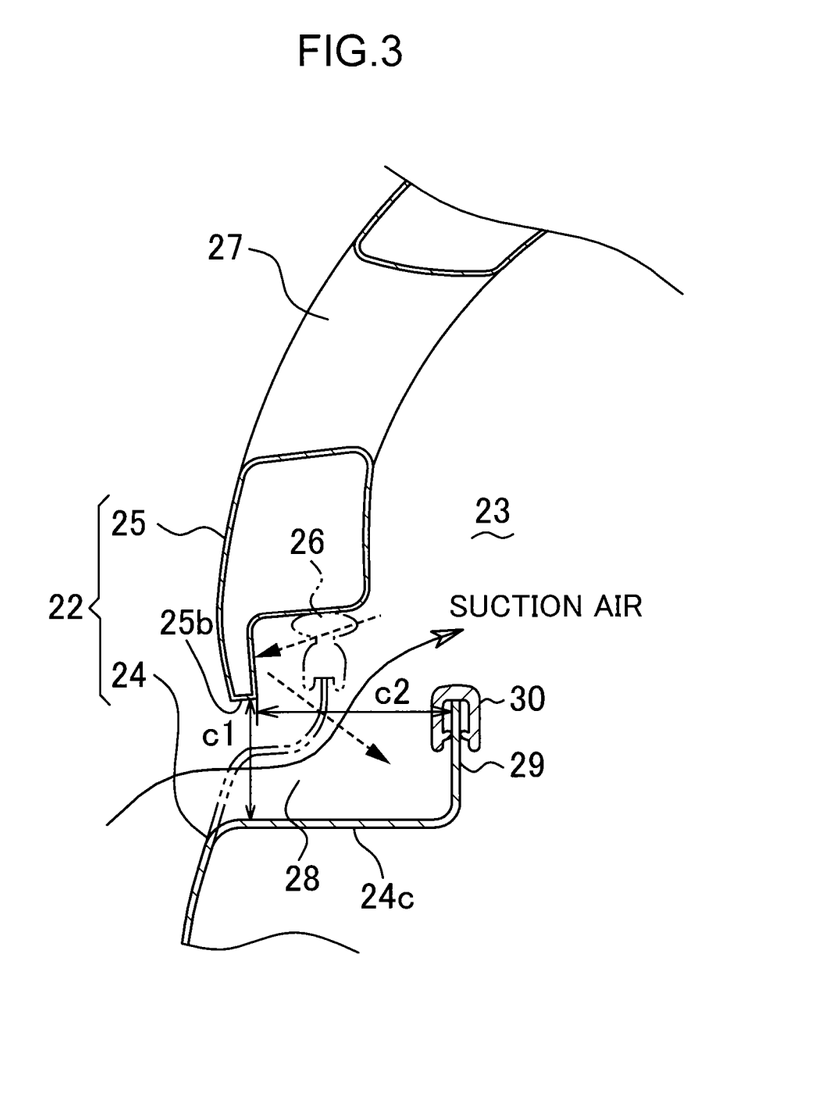
FIG. 3 is an enlarged cross-sectional view taken along line III-III in FIG. 1.

The part of the opening edge 24b of the first panel 24 which part is inwardly retracted by the recess portion 24c forms an upright portion 29 that stands upright at a position shifted from the peripheral portion inward of the peripheral portion of the second panel 25 at a distance equal to the dimension of the gap c2, as shown in FIG. 3. The seal member 30, for example, a weather strip, is attached to an upper end of the upright portion 29. In terms of appearance and prevention of infiltration of rainwater, it is preferable that the upright portion 29 has such an up-down directional dimension that the upright portion 29 stands up to a height position which enables the upright portion 29 to inhibit the inside of the device room 23 from being externally visible through the air suction port 28, that is, to a height position that is the same as or higher than the height position of a lower end 25b of the peripheral portion of the second panel 25 which lower end forms the air suction port 28.

The air suction port 28 may be located at a position that is the same as or different from the position of the air suction holes 27 in the front-back direction. Furthermore, the size of the air suction port 28 may be optionally set according to the required amount of sucked air.

According to the embodiment, the recess portion 24c is recessed not only inward but also downward as shown in FIG. 3 in order to form a large opening of the air suction port 28 in the up-down direction. However, if it is possible to obtain the required opening area of the entire air suction port 28 only by the inward recess, the downward recess need not be provided.

As to the gaps c1 and c2, the inward-outward directional gap c2 is preferably larger than the up-down directional gap c1. This enables a large channel area to be ensured with a reduced external opening area of the air suction port 28.

As described above, the air suction port 28 in the excavator is formed by the partial shift of the peripheral portion of the second panel 25 from the opening edge 24b in the inward-outward direction, which allows the number or opening area of air suction holes 27 drilled in the side guard panel 22, that is, in the total opening area of the air suction ports holes to be reduced, thereby allowing the appearance of the excavator to be improved. Moreover, the reduction in the number of air suction holes 27 allows the effective area of the guard panel to be increased, thus enabling a sufficient area for application of design decals and a caution label to be ensured.

The air suction port 28, formed by the shift of the first panel 24 and the second panel 25 from each other in the inward-outward direction, causes noise such as engine sound shown by dashed arrows in FIG. 3 to be reflected by the opening edge 24b and peripheral portion of the first and second panels 24 and 25 that have been shifted from each other as above, thus allowing the noise to be inhibited from leaking to the outside in spite of the formation of the air suction port 28. This also makes it possible to suppress infiltration of rainwater through the air suction port 28.

Moreover, the upright portion 29, if standing up to a height position that is the same as or higher than the position of the lower end 25b of the peripheral portion of the second panel 25 forming the air suction port 28, as described above, can further increase the advantage in appearance and prevention of leakage of noise, and prevention of infiltration of rainwater.

Besides, according to the embodiment, the seal member 30 attached to the upper end portion of the upright portion 29 can hold rainwater back to enhance the effect of the prevention of infiltration of rainwater.

The present invention is not limited to the embodiment but embraces, for example, the following aspects.

(1) Although the air suction port 28 according to the embodiment is provided only at one position in the front portion of the right side surface of the side guard panel 22, the air suction port according to the present invention may be provided at a plurality of positions arranged in the front-back direction.

(2) Although the air suction port 28 is formed in the right side surface of the side guard panel 22 in the embodiment because the left peripheral portion of the second panel 25 is pivotably connected to the first panel 24, the guard panel according to the present invention is not limited to this embodiment. For example, if the second panel of the guard panel pivots around a rear peripheral portion or a front peripheral portion of the second panel, the air suction port may be formed in a front surface portion or a rear surface portion of the guard panel.

(3) Although the second panel 25 according to the embodiment is pivotably attached to the first panel 24 by the hinge, the second panel according to the present invention may be pivotably attached to a structure other than the first panel, for example, to a frame member if the frame member is provided on the side guard panel 22 shown in FIG. 1.

(4) The guard panel formed with the air suction port according to the present invention is not limited to the side guard panel 22 according to the embodiment. The air suction port according to the present invention may be formed in the rear guard panel which covers the engine room, or across both the rear guard panel and the side guard panel. Also in this case, the air suction port can be formed if the guard panel has the first panel and the second panel.

(5) The present invention includes also an embodiment where either of first and second panels has an opening-and-closing panel that pivots around a hinge in an opening-closing direction wherein the peripheral portion of the second panel can be supported by the opening edge of the first panel in a state where the first panel is closed.

(6) The present invention is not limited to excavators but is widely applicable to construction machines including an opening and closing guard panel that covers a device accommodation space.

As described above, the present invention provides a construction machine including a guard panel with an air suction port, the construction machine being capable of having required intake opening area with suppressed disadvantages of the air suction port. A construction machine provided by the present invention includes: a lower travelling body; an upper slewing body mounted on the lower travelling body so as to be able to slew and having a device accommodation space; devices accommodated in the device accommodation space, the device including an engine, a cooling fan and a heat exchanger, the cooling fan adapted to rotate to introduce outside cooling air into the device accommodation space and blow the air through the heat exchanger; a guard panel to cover the device accommodation space, the guard panel including a first panel with an opening edge defining an opening for maintenance and a second panel so pivotable as to open and close the opening and having a peripheral portion adapted to be supported by the opening edge of the first panel in a state where the second panel closes the opening; and a seal member attached to the peripheral portion of the second panel to make close contact with the opening edge of the first panel in a state where the second panel closes the opening. A part of the peripheral portion of the second panel and a corresponding part of the opening edge of the first panel are shifted from each other in an inward-outward direction of the first and second panels to thereby form an air suction port, which brings the device accommodation space into communication with an outside thereof, between the second panel and the first panel.

Thus forming the air suction port by partial shift of the opening edge of the first panel and the peripheral portion of the second panel from each other in the inward-outward direction enables the number or opening area of air suction holes to be formed in the guard panel, that is, in the sum of the opening areas of the air suction holes, to be reduced, thereby allowing the construction machine to have more improved appearance. Furthermore, respective parts of the opening edge of the first panel and the peripheral portion of the second panel which are shifted from each other in the inward-outward direction to form the air suction port can cause noise such as engine sound in the device accommodation space to be reflected to inhibit the noise from leakage to an outside and to suppress infiltration of rainwater through the air suction port. Moreover, the reduction in the sum of the opening areas of the air suction holes allows the effective area of the guard panel to be commensurately increased, thus allowing a sufficient area for application of, for example, design decals and a caution label to be ensured.

In a preferred specific aspect, for example, the device accommodation space includes an engine room provided in a rear portion of the upper slewing body and a device room covered by the first and second panels and communicating with the engine room; the engine, the cooling fan, and the heat exchanger are laterally juxtaposed in the engine room so as to locate the heat exchanger on one end side of the lateral arrangement; the device room communicates with inside of the engine room on one of a right side and a left side of the upper slewing body at which side the heat exchanger is positioned; and at least respective parts of the opening edge of the first panel and the peripheral portion of the second panel, the respective parts being adapted to externally cover the device room, are shifted from each other in the inward-outward direction to form the air suction port. In this aspect, in which the device accommodation space includes the engine room and the device room which communicate with each other on the side at which the heat exchanger is positioned and the first and second panels covering the device room form the air suction port, outside air can be introduced near the heat exchanger, which allows a sufficient amount of cooling air to be provided for the heat exchanger and thus enables cooling performance to be improved.

As to specific structure of the first and second panels, it is preferable that a part of the opening edge of the first panel is inwardly recessed beyond the peripheral portion of the second panel to form the air suction port. This structure enables the air suction port to be easily and efficiently formed as compared with other structures, for example, a structure in which the peripheral portion of the first panel is partly cut away and in which a projecting piece is provided at a distance from the second panel inside the cut-away portion.

In this case, preferably, the second panel is positioned above the first panel, and the part of the opening edge of the first panel which part is inwardly recessed beyond the peripheral portion of the second panel forms an upright portion that stands upward. The upright portion is capable of effectively inhibiting rainwater from infiltrating from the outside through the air suction port.

In this case, more preferable is that the upright portion has such a size that the upright portion stands up to a height position identical to or higher than a height position of a lower end of the peripheral portion of the second panel.

This application is based on Japanese Patent application No. 2013-033282 filed in Japan Patent Office on Feb. 22, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine comprising:
   a lower travelling body;
   an upper slewing body mounted on the lower travelling body so as to be able to slew and having a device accommodation space;
   devices accommodated in the device accommodation space and including an engine, a cooling fan, and a heat exchanger, the cooling fan adapted to rotate to introduce outside cooling air into the device accommodation space and blow the air through the heat exchanger;
   a guard panel to cover the device accommodation space, the guard panel including a first panel with an opening edge defining an opening for maintenance and a second panel pivotable so as to open and close the opening and having a peripheral portion adapted to be supported by the opening edge of the first panel in a state where the second panel closes the opening; and
   a seal member attached to the opening edge of the first panel and adapted to make close contact with the peripheral portion of the second panel in a state where the second panel closes the opening, wherein a part of the opening edge of the first panel is shifted inward toward the accomodation space and away from a part of the peripheral portion of the second panel to form an air suction port, which brings the device accommodation space into communication with an outside of the device accommodation space, between the second panel and the first panel.

2. The construction machine according to claim 1, wherein:
   the device accommodation space includes an engine room provided in a rear portion of the upper slewing body and a device room covered by the first and second panels and communicating with the engine room;
   the engine, the cooling fan, and the heat exchanger are laterally juxtaposed in the engine room so as to locate the heat exchanger on one end side of the lateral arrangement;
   the device room communicates with inside of the engine room on one of a right side and a left side of the upper slewing body at which side the heat exchanger is positioned; and
   at least respective parts of the opening edge of the first panel and the peripheral portion of the second panel, the respective parts being adapted to externally cover the device room, are shifted from each other in the inward-outward direction to form the air suction port.

3. The construction machine according to claim 1, wherein a part of the opening edge of the first panel is inwardly recessed beyond the peripheral portion of the second panel to form the air suction port.

4. The construction machine according to claim 3, wherein the second panel is positioned above the first panel, and the part of the opening edge of the first panel which part is inwardly recessed beyond the peripheral portion of the second panel forms an upright portion that stands upward.

5. The construction machine according to claim 4, wherein the upright portion has such a size that the upright portion stands up to a height position identical to or higher than a height position of a lower end of the peripheral portion of the second panel.

* * * * *